US012616885B2

(12) United States Patent
Dalton et al.

(10) Patent No.: US 12,616,885 B2
(45) Date of Patent: May 5, 2026

(54) BASKET DRAINAGE SYSTEM

(71) Applicant: Textron Inc., Providence, RI (US)

(72) Inventors: Michael O'Brien Dalton, Evans, GA (US); Matthew Daniel Wilson, Graniteville, SC (US); Rebecca Ann Hassan, Augusta, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 334 days.

(21) Appl. No.: 18/406,354

(22) Filed: Jan. 8, 2024

(65) Prior Publication Data
US 2025/0222329 A1 Jul. 10, 2025

(51) Int. Cl.
| | |
|---|---|
| *A63B 55/60* | (2015.01) |
| *B60R 9/06* | (2006.01) |
| *B60R 9/08* | (2006.01) |
| *B60R 13/07* | (2006.01) |

(52) U.S. Cl.
CPC .............. *A63B 55/61* (2015.10); *B60R 9/06* (2013.01); *B60R 9/08* (2013.01); *B60R 13/07* (2013.01); *B60Y 2200/86* (2013.01)

(58) Field of Classification Search
CPC .. A63B 55/61; B60R 9/06; B60R 9/08; B60R 13/07
See application file for complete search history.

(56) References Cited

U.S. PATENT DOCUMENTS

| | | | | |
|---|---|---|---|---|
| 4,195,757 | A * | 4/1980 | Jefferson | B62J 7/04 220/555 |
| 4,227,737 | A * | 10/1980 | Vogt | B60R 11/06 296/76 |
| 4,378,888 | A * | 4/1983 | Reed | A47G 25/12 224/400 |
| 4,821,358 | A * | 4/1989 | Wyckoff | A63B 57/60 15/88.1 |
| 5,685,467 | A * | 11/1997 | Niemi | B60R 9/00 220/608 |
| 10,112,555 | B2 * | 10/2018 | Aguilera Ramirez | B60R 5/04 |
| 10,166,446 | B2 * | 1/2019 | Whittington, III | A63B 57/203 |
| 10,239,393 | B2 * | 3/2019 | Held | B60R 9/04 |
| 2004/0124608 | A1 * | 7/2004 | McCoy | B60R 9/06 280/495 |
| 2005/0284704 | A1 * | 12/2005 | Hernandez | E04H 6/428 184/106 |
| 2007/0007315 | A1 * | 1/2007 | Hanson | B60N 3/108 224/483 |
| 2007/0138820 | A1 * | 6/2007 | Hanson | A63B 55/61 224/274 |
| 2007/0210126 | A1 * | 9/2007 | Hanson | A63B 57/00 224/274 |
| 2007/0284908 | A1 * | 12/2007 | Ball | B62D 31/003 296/63 |
| 2009/0108632 | A1 * | 4/2009 | Wen | B62D 25/08 296/203.01 |

(Continued)

*Primary Examiner* — Brian D Nash
(74) *Attorney, Agent, or Firm* — Sandberg Phoenix & von Gontard, P.C.

(57) ABSTRACT

A basket for a vehicle, wherein the basket comprises a solid bottom having one or more fluid egress port disposed therein. The basket additionally comprises one or more hollow drain spout extending from an underside of the bottom of the basket, each spout extending from and fluidly connected to a respective one of the one or more fluid egress port.

14 Claims, 12 Drawing Sheets

(56)　　　　　References Cited

U.S. PATENT DOCUMENTS

| | | | |
|---|---|---|---|
| 2009/0167062 A1* | 7/2009 | Greif ...................... | B60J 7/0061 |
| | | | 296/213 |
| 2010/0193527 A1* | 8/2010 | Nelson ................... | A47L 13/50 |
| | | | 220/601 |
| 2012/0055967 A1* | 3/2012 | Mcmillan ............. | B60R 9/0485 |
| | | | 224/315 |
| 2015/0122859 A1* | 5/2015 | Brinkley ................ | B23P 19/04 |
| | | | 29/469 |
| 2015/0175338 A1* | 6/2015 | Culp ................. | B65D 81/3897 |
| | | | 220/592.24 |
| 2015/0250096 A1* | 9/2015 | Biers, Sr. ............... | B60R 21/13 |
| | | | 224/401 |
| 2017/0197556 A1* | 7/2017 | Bonenberger ....... | B62D 21/183 |
| 2018/0001827 A1* | 1/2018 | Robertson .............. | B60R 11/06 |
| 2018/0099548 A1* | 4/2018 | Held ...................... | B60J 5/0487 |
| 2019/0111324 A1* | 4/2019 | Williams ............... | A63B 47/04 |
| 2020/0114980 A1* | 4/2020 | DeLong ............ | B62D 33/0207 |
| 2020/0215401 A1* | 7/2020 | Morgan ................. | B62D 25/08 |
| 2024/0359632 A1* | 10/2024 | Sartin ...................... | B60R 9/06 |
| 2025/0001951 A1* | 1/2025 | Dalton ...................... | B60R 9/08 |
| 2025/0033447 A1* | 1/2025 | Dobson ................. | B60J 7/1635 |
| 2025/0058716 A1* | 2/2025 | Morgan ................... | B60R 9/08 |
| 2025/0121624 A1* | 4/2025 | Dalton ................... | B42F 9/002 |

* cited by examiner

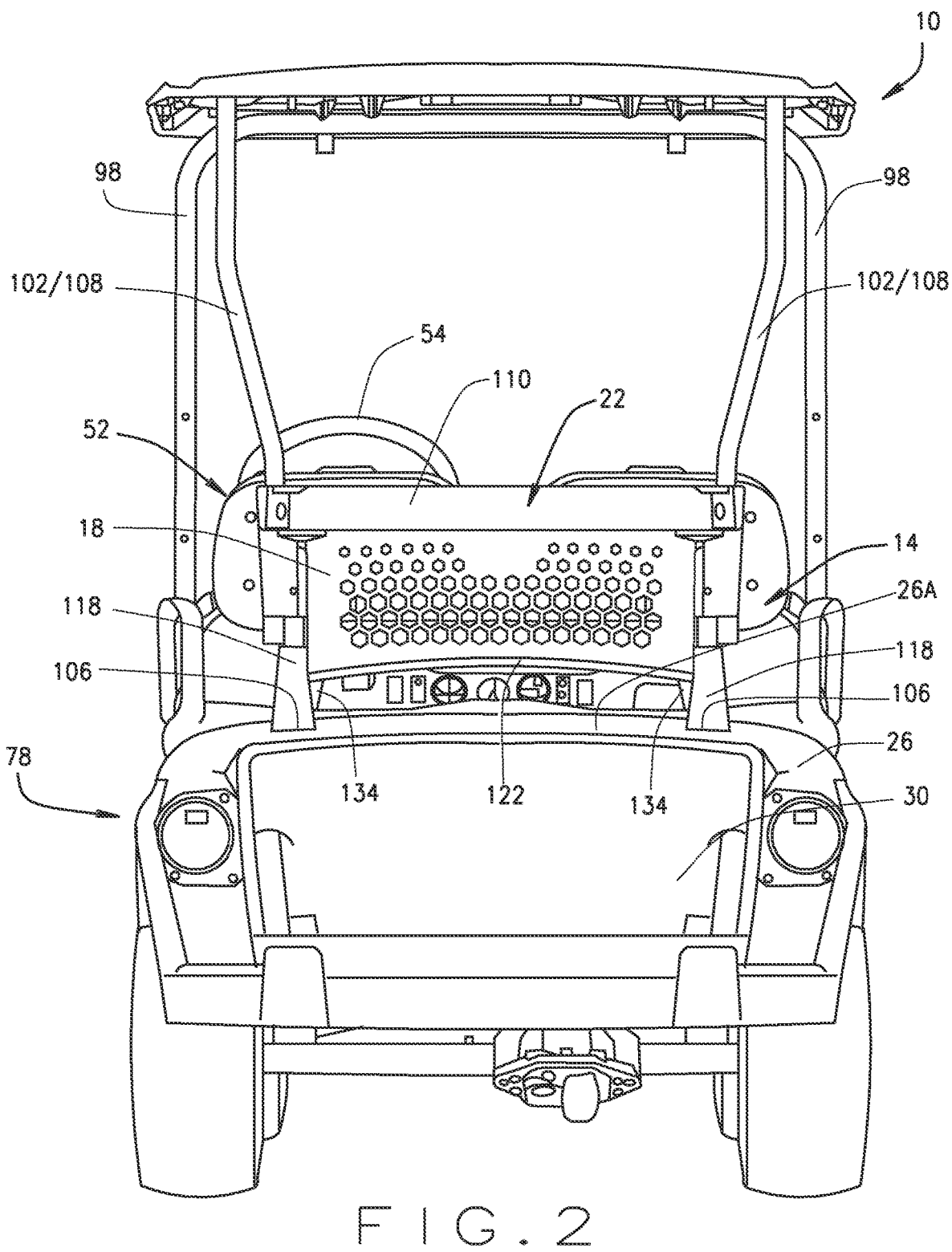
F I G . 2

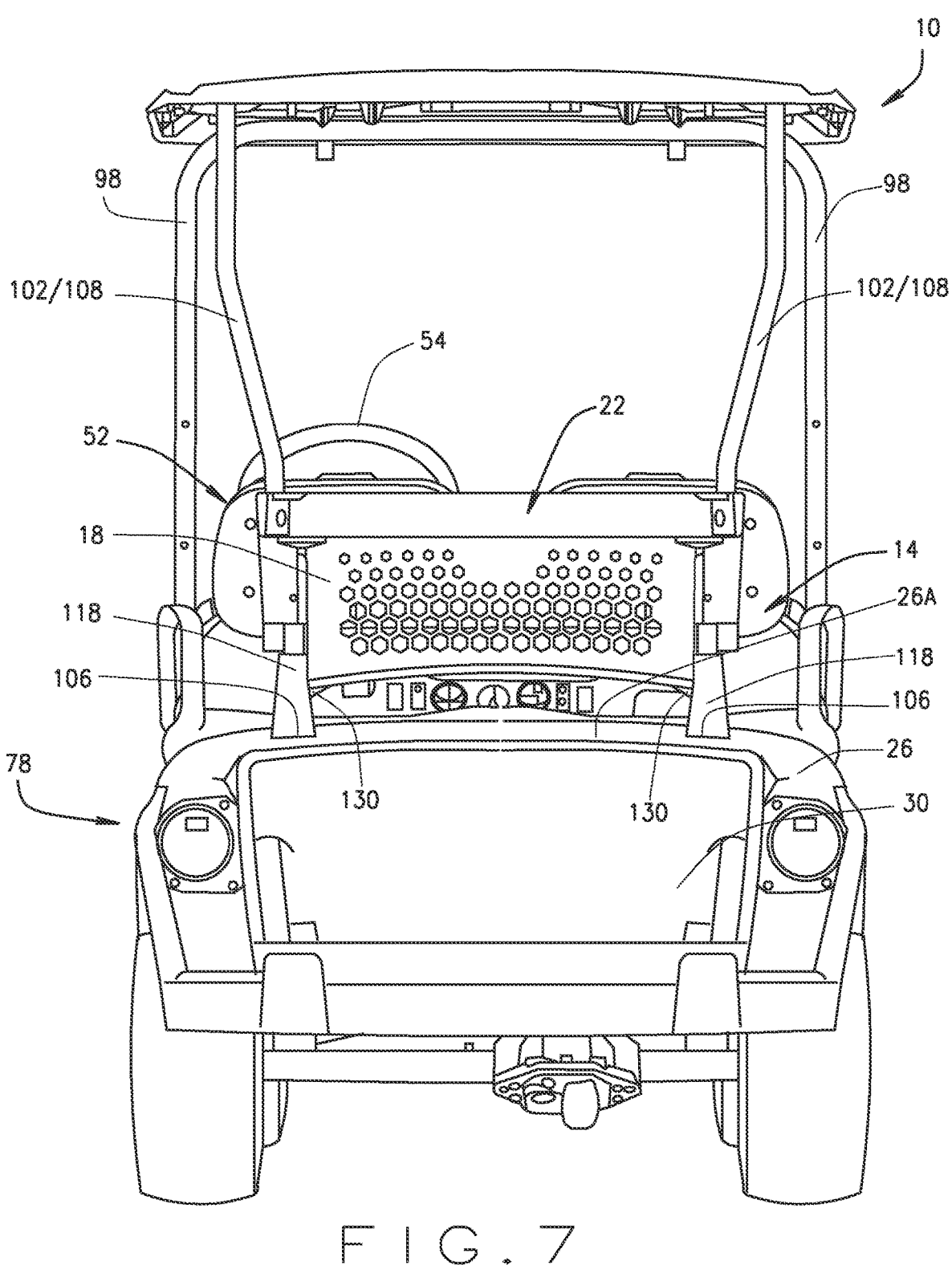
F I G . 7

BASKET DRAINAGE SYSTEM

FIELD

The present teachings relate to golf car (or similar light-weight vehicle) baskets (such as a sweater basket), and more particularly to basket drainage system for such vehicles.

BACKGROUND

The statements in this section merely provide background information related to the present disclosure and may not constitute prior art.

Traditionally, known light weight vehicles (such as a golf car) baskets (such as sweater baskets) have a plurality of openings, e.g., elongated slots and/or holes of any shape, dispersed across a bottom panel of a sweater basket for water or other liquids to drain out onto the golf car structure below the basket. Particularly, the openings dispersed across a bottom panel of a sweater basket allows water and liquids that collect in the sweater basket to drain onto the rear deck of the golf car and into the bag well where the water and liquids will inconveniently splash and drain of the rear deck and also will undesirably contact golf clubs, towels, golf bags, etc., disposed in the bag well.

SUMMARY

In various embodiments, the present disclosure provides a sweater basket for a golf car (though it is understood that these various embodiments may be generalized to any lightweight vehicle having a basket), wherein the sweater basket comprises a solid bottom having one or more fluid egress port disposed therein, and one or more hollow drain spout extending from an underside of the bottom of the sweater basket. Each drain spout extends from and is fluidly connected to a respective one of the one or more fluid egress port.

In various other embodiments, the present disclosure provides a sweater basket drainage system for a golf car, wherein the sweater basket drainage system comprises at least one strut boot and a sweater basket. Each strut boot is mountable within a respective one of at least one strut aperture formed in a rear deck of the golf car. The sweater basket comprises a solid bottom having one or more fluid egress port disposed therein, and one or more hollow drain spout extending from an underside of the bottom of the sweater basket. Each drain spout extends from and is fluidly connected to a respective one of the one or more fluid egress port. Each drain spout is structured to direct fluid from within the sweater basket through a respective one of the one or more strut aperture to a ground surface beneath the golf car.

In yet other embodiments, the present disclosure provides a lightweight vehicle, wherein the vehicle comprises a rear body having a rear deck, and a basket drainage system. The basket drainage system comprises at least one strut boot and a basket. Each strut boot is mountable within a respective one of at least one strut aperture formed in a rear deck of the golf car. The basket comprises a solid bottom having one or more fluid egress port disposed therein, and one or more hollow drain spout extending from an underside of the bottom of the basket. Each drain spout extends from and is fluidly connected to a respective one of the one or more fluid egress port. Each drain spout is structured to direct fluid from within the sweater basket through a respective one of the one or more strut aperture to a ground surface beneath the golf car.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

BRIEF DESCRIPTION OF DRAWINGS

The drawings described herein are for illustration purposes only and are not intended to limit the scope of the present teachings in any way.

FIG. 2 is a review of the vehicle having the basket fluid drainage system shown in FIG. 1, in accordance with various embodiments of the present disclosure.

FIG. 7 is a review of the vehicle (exemplarily illustrated as a golf car) having the basket fluid drainage system (e.g., a sweater basket fluid drainage system) shown in FIG. 1, in accordance with various other embodiments of the present disclosure.

Corresponding reference numerals indicate corresponding parts throughout the several views of drawings.

DETAILED DESCRIPTION

Figure 1:
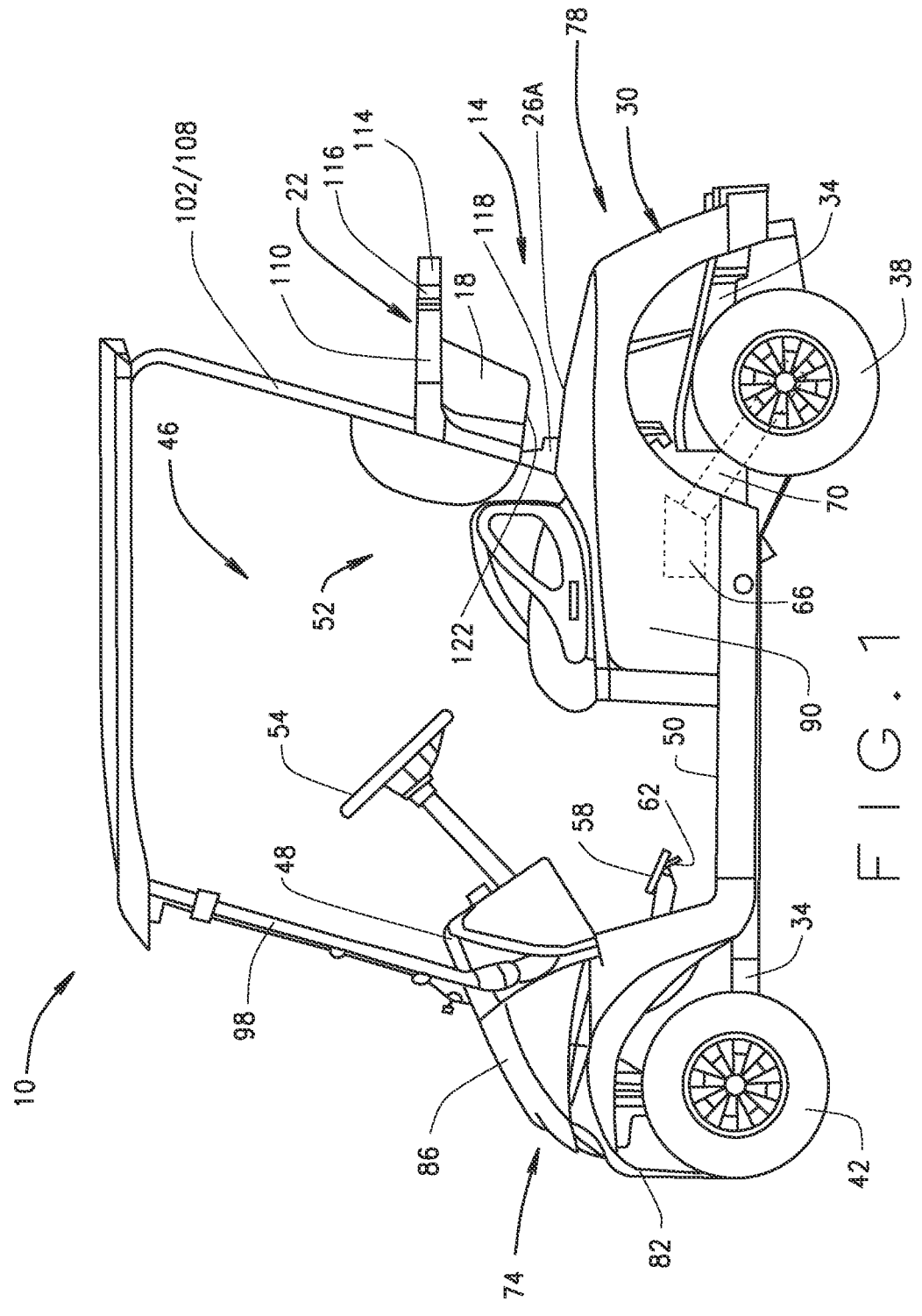
FIG. 1 is a side view of a vehicle (exemplarily a golf car) comprising a basket fluid drainage system (e.g., a sweater basket fluid drainage system), in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 3:
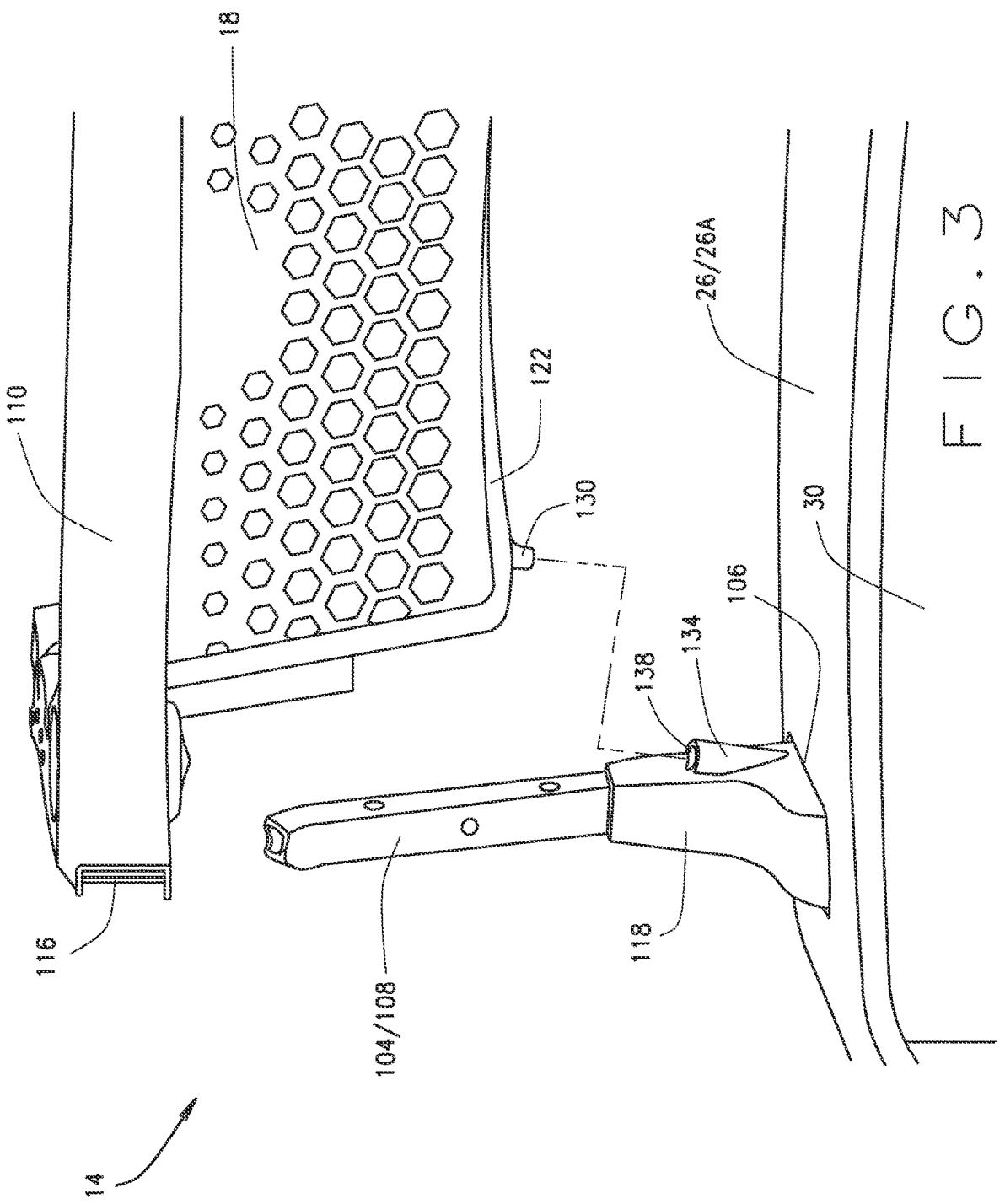
FIG. 3 is an exploded view of a portion of the basket fluid drainage system shown in FIGS. 1 and 2, in accordance with various embodiments of the present disclosure.
Figure 4:
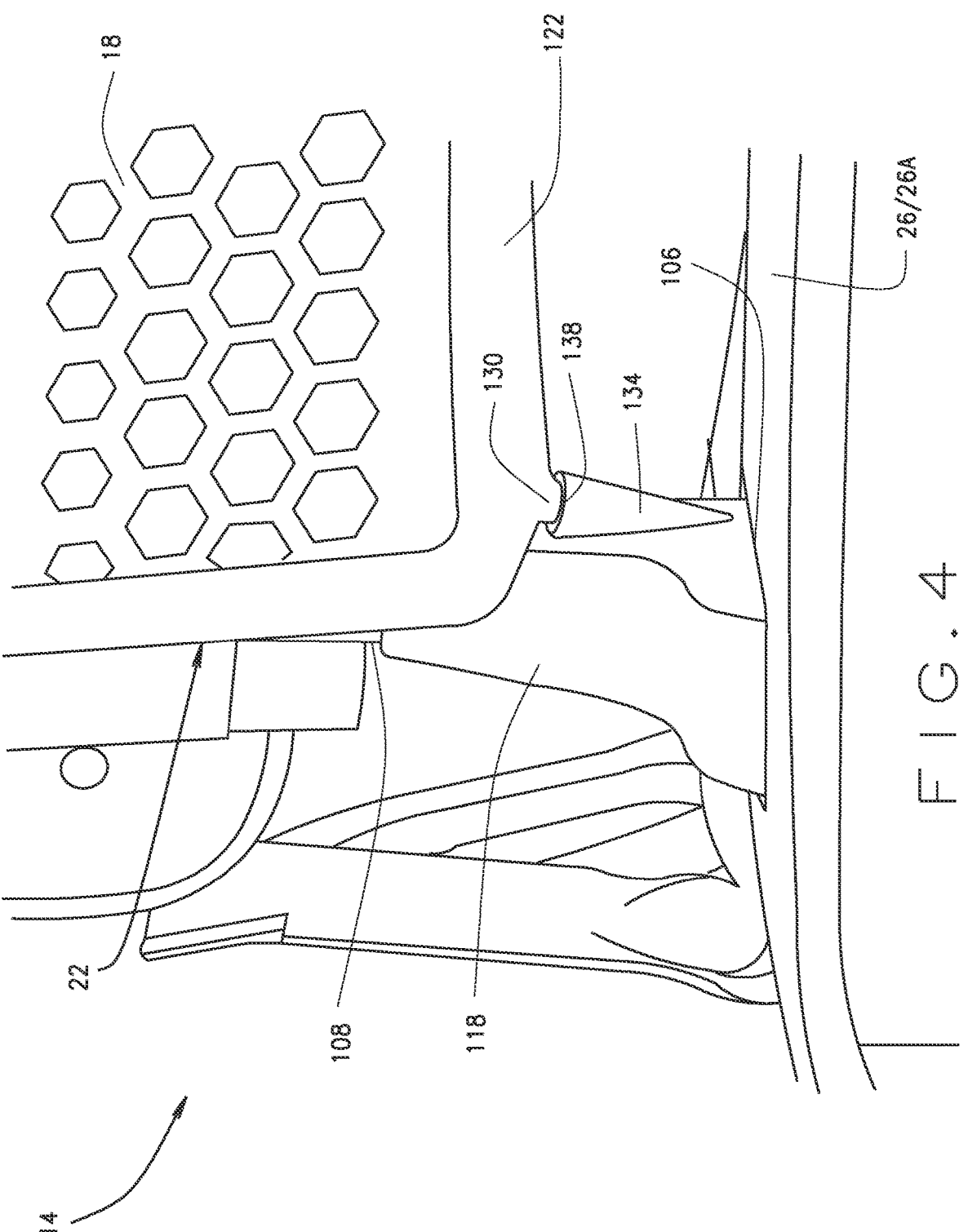
FIG. 4 is a view of a portion of the basket fluid drainage system shown in FIGS. 1 and 2, in accordance with various embodiments of the present disclosure.
Figure 5:
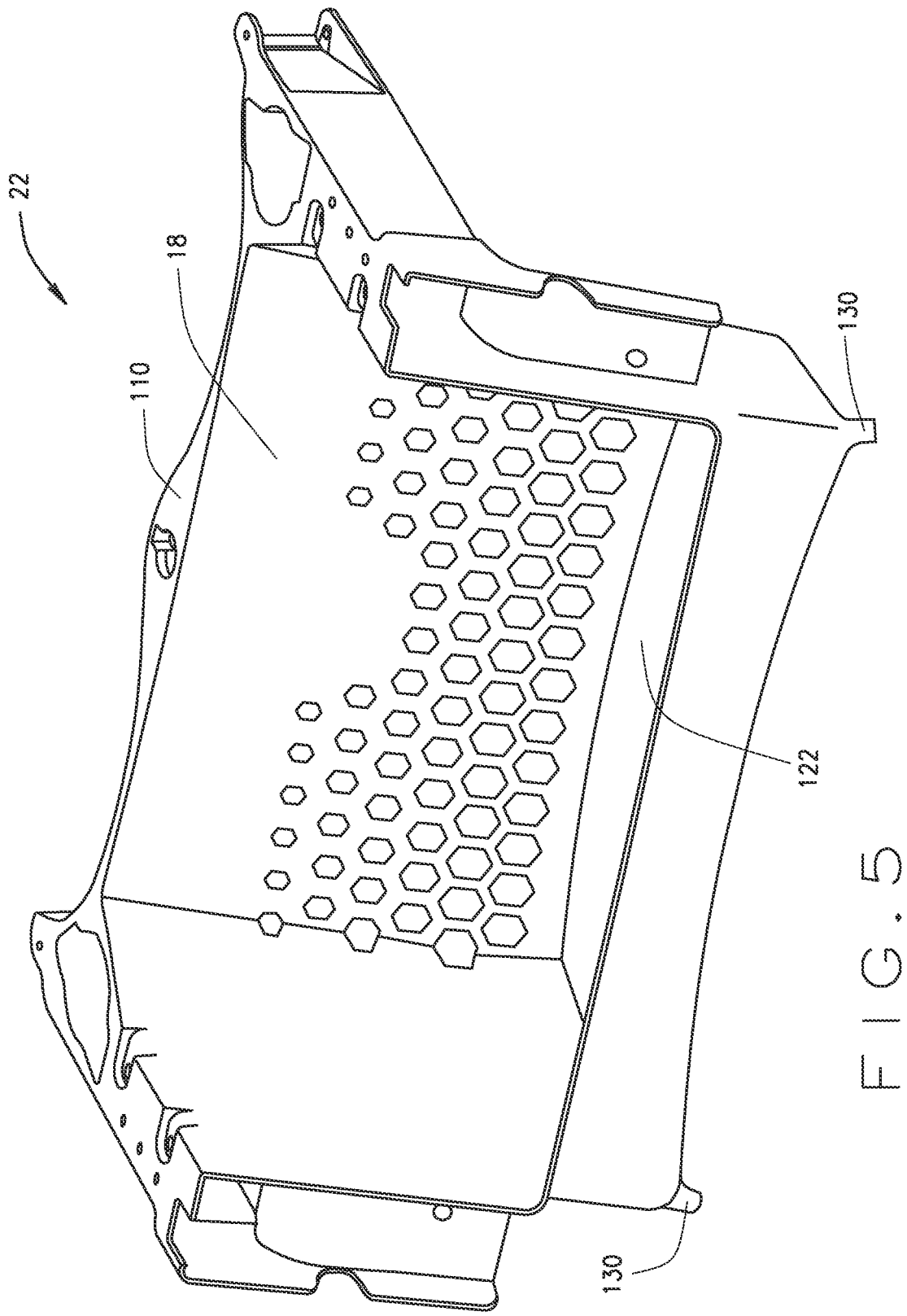
FIG. 5 is an isometric view of a sweater basket and golf bag retention yoke of the basket fluid drainage system shown in FIGS. 1, 2, 3 and 4, (e.g., a sweater basket fluid drainage system) in accordance with various embodiments of the present disclosure.

Referring to FIGS. 1, 3 and 7, in various embodiments the present disclosure provides a vehicle 10 (e.g., a golf car) comprising a basket fluid drainage system 14. The basket fluid drainage system 14 is structured and operable to remove fluids (e.g., rain water, melted ice, spilled beverages, etc.) from a basket 18 (e.g., a sweater basket 18 of a sweater basket and golf bag retention yoke 22) and direct the fluid through a rear deck 26 of the vehicle 10 so that the fluid does not fall on a top surface 26A of the rear deck 26 of the vehicle 10, and/or into a bag well 30 of the vehicle 10 when the vehicle 10 is a golf car, but rather is deposited under the rear deck 26 and onto a ground surface there beneath. It should be understood that although the vehicle 10 can be any lightweight vehicle such as a maintenance vehicle, a cargo vehicle, a shuttle vehicle, an all-terrain vehicle (ATV), a utility-terrain vehicle (UTV), a worksite vehicle, a buggy, or any other suitable type of utility or low-speed vehicle that is not designated for use on roadways, the vehicle 10 will be exemplarily illustrated and sometimes referred to herein as a golf car.

The vehicle 10 generally includes a chassis or frame 34, a pair of rear wheels 38 and a pair of front wheels 42 operationally connected to the chassis 34, and a passenger compartment 46. In various embodiments, the passenger compartment 46 generally includes a dash console 48, a floorboard 50, and a passenger seating structure 52. The dash console 48 can include one or more instrument displays, gauges, vehicle control devices and/or storage compartments. The passenger compartment 46 additionally includes the steering wheel 54 for use by the passenger/user to control the directional movement of the vehicle 10, a brake pedal 58 for use by the passenger/user to control slowing and stopping of the vehicle 10, and an accelerator pedal 62 for use by the operator to control the torque delivered by a prime mover 66 to one or more of the rear and/or front wheels 38 and/or 42. Particularly, the prime mover 66 is operatively connected to a drivetrain 70 that is operatively connected between the prime mover and at least one of the rear and/or front wheels 38 and/or 42.

The vehicle 10 further comprises a front body assembly 74 and a rear body assembly 78. In various embodiments, the front body assembly 74 comprises the bumper and wheel-well assembly 82 that is mounted to a chassis 34 and a front cowl 86 that is mounted to the bumper and wheel-well assembly 82 and/or the chassis 34. In various embodiments, the rear body assembly 78 comprises a seat pedestal portion 90, the rear deck 78 and the golf bag well 30. In various embodiments the vehicle 10 can further comprise a canopy 94 supported above the passenger compartment 46 by a pair of canopy front struts 98 and a pair of canopy rear struts 102.

Figure 8A:
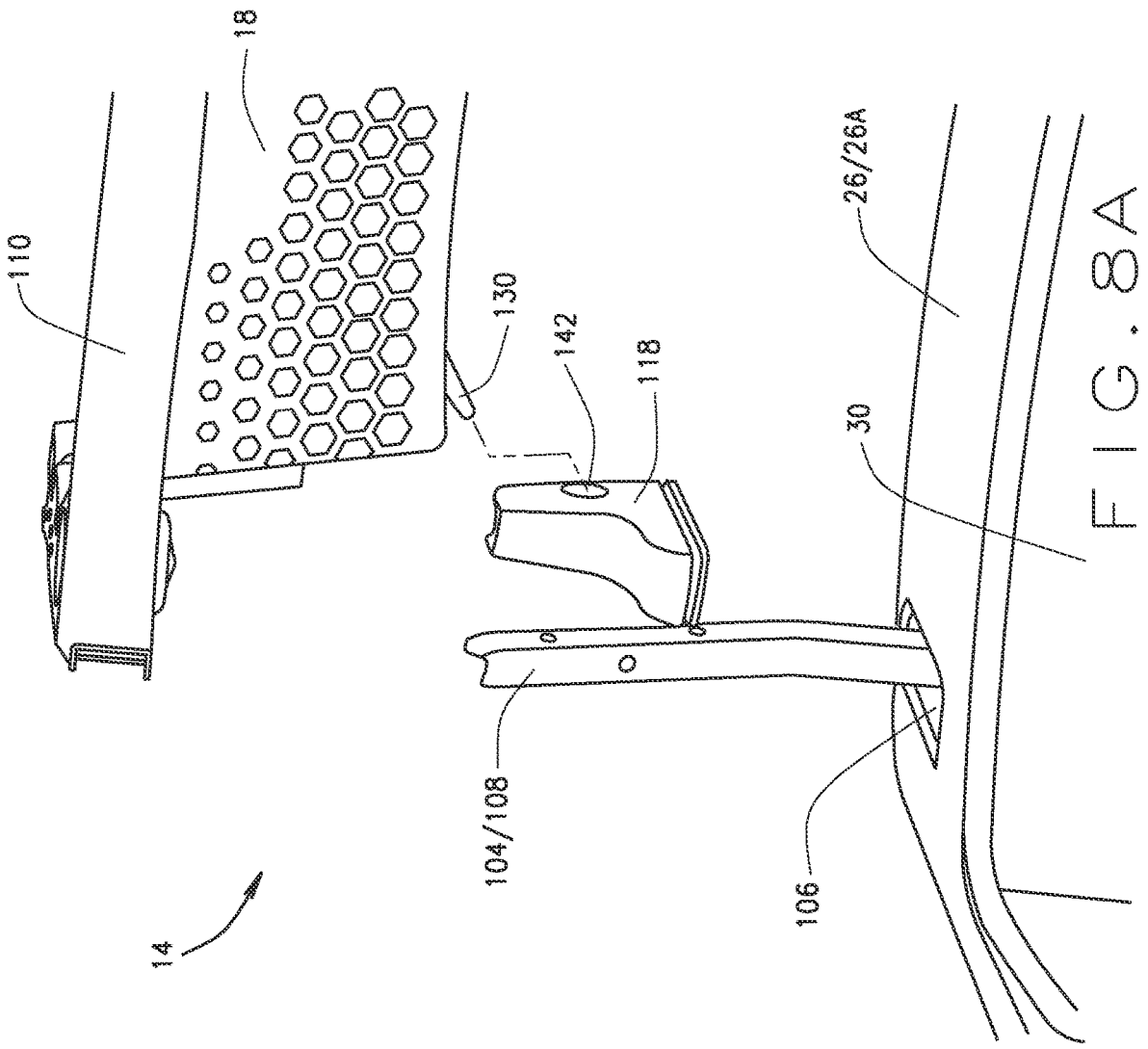
FIG. 8A is an exploded view of a portion of the basket fluid drainage system shown in FIGS. 1 and 7, in accordance with various embodiments of the present disclosure.
Figure 8B:
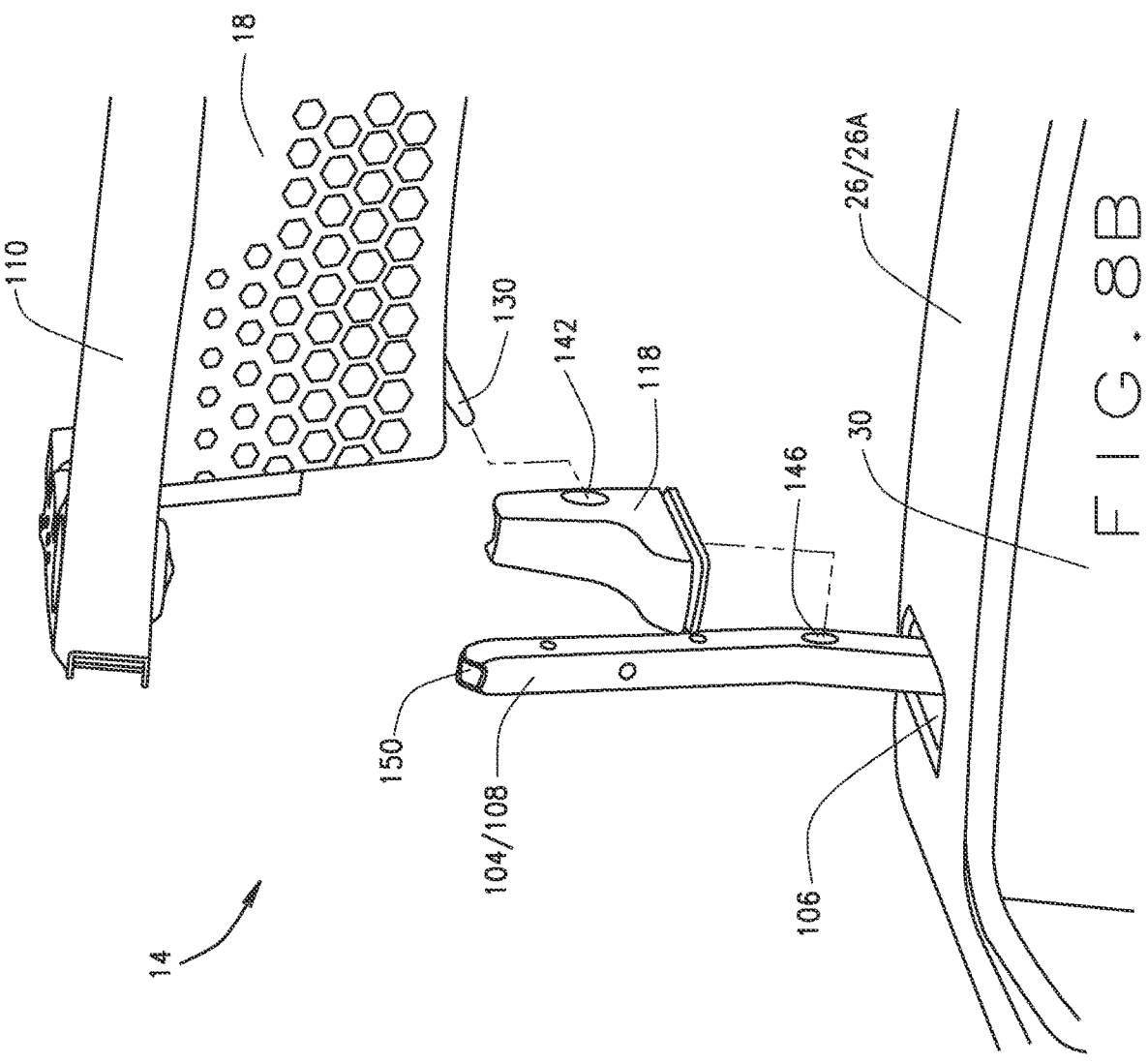
FIG. 8B is an exploded view of a portion of the basket fluid drainage system shown in FIGS. 1 and 7, in accordance with various alternative embodiments of the present disclosure.
Figure 9:
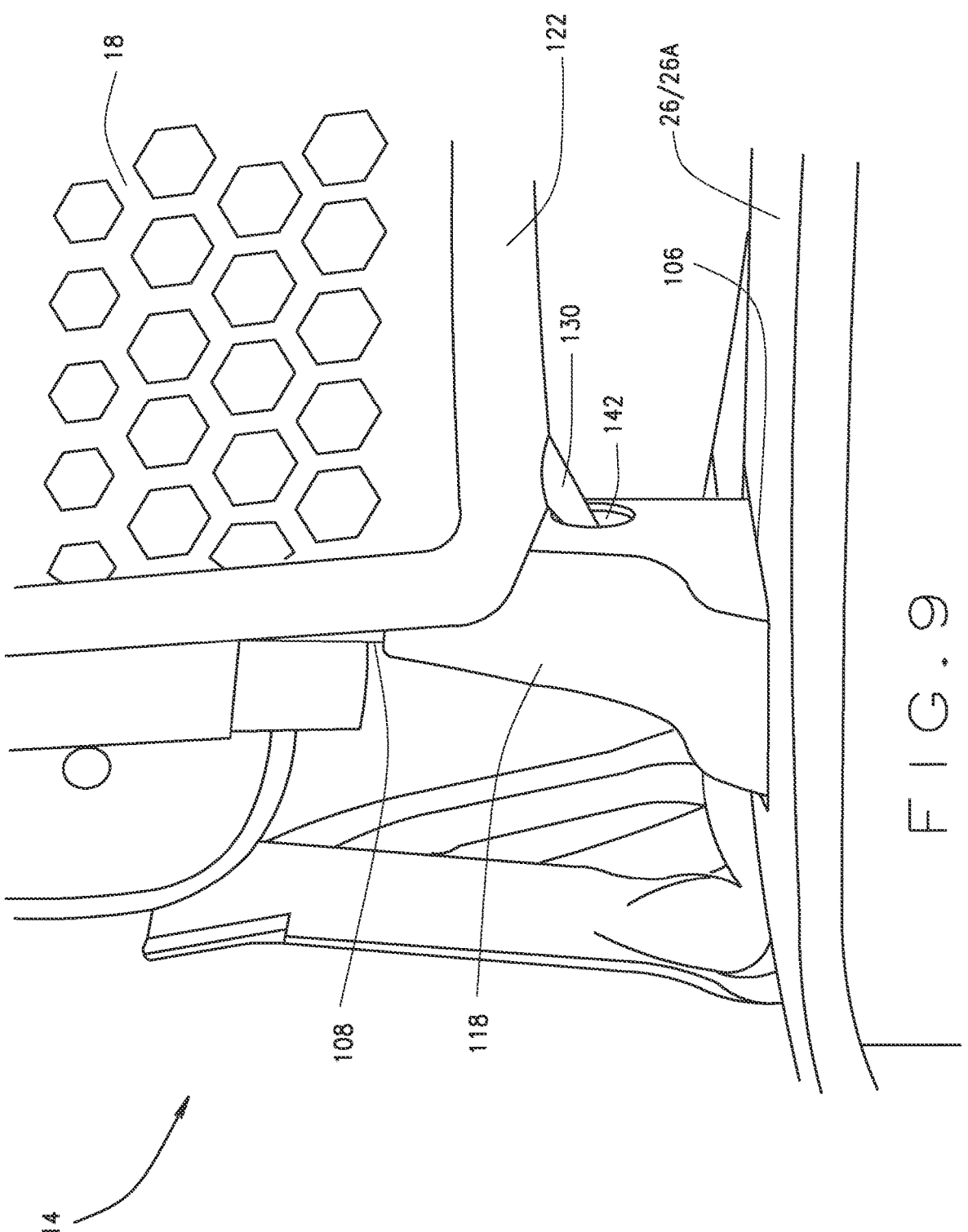
FIG. 9 is a view of a portion of the basket fluid drainage system shown in FIGS. 1 and 7, in accordance with various embodiments of the present disclosure.
Figure 10:
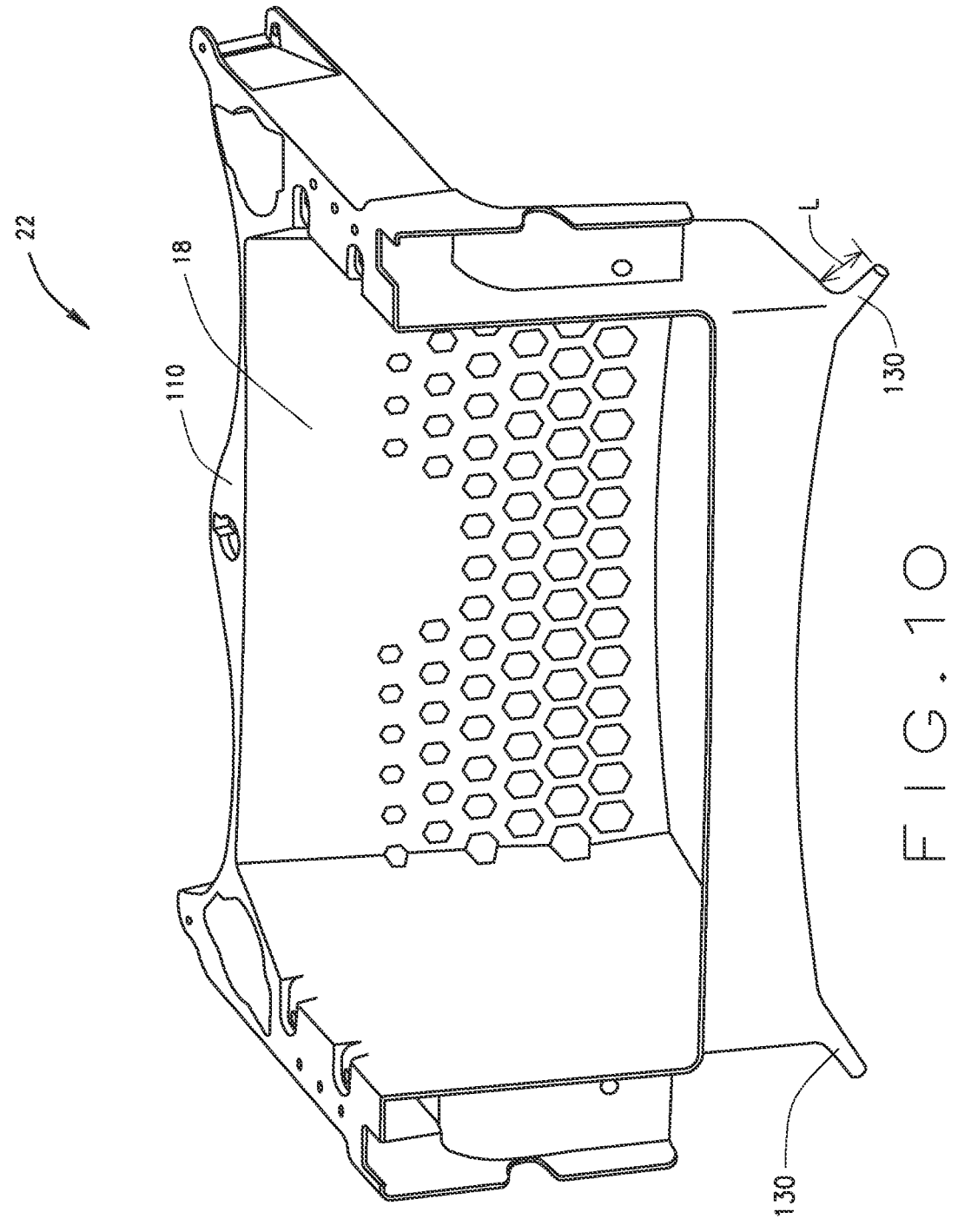
FIG. 10 is an isometric view of a sweater basket and golf bag retention yoke of the basket fluid drainage system shown in FIGS. 1, 7, 8 and 9, (e.g., a sweater basket fluid drainage system) in accordance with various embodiments of the present disclosure.

In various embodiments, basket 18, and/or the sweater basket and golf bag retention yoke 22 when the vehicle 10 is configured as a golf car, is mounted to the canopy rear struts 102, while in various other embodiments the basket 18, and/or the sweater basket 18 of the sweater basket and golf bag retention yoke 22 when the vehicle 10 is configured as a golf car, can be mounted to and supported by support fixtures 104 (shown in FIGS. 3 and 8) that are not part of the canopy rear struts 102. For simplicity and clarity the basket 18, and/or the sweater basket and golf bag retention yoke 22 when the vehicle 10 is configured as a golf car, will be described herein as mounted to and supported by basket support struts 108, which will be understood to comprise either the canopy rear struts 102 and/or the support fixtures 104. In the embodiments wherein the vehicle 10 is configured as a golf car, the sweater basket and golf bag retention yoke 22 comprises the sweater basket 18, a golf bag retention yoke 110, a pair of retention straps 114 and a pair of retention strap clamps 116. In various embodiments, the basket support struts 108 extend through strut apertures 106 formed in the rear deck 26 and are mounted to the chassis 34 and/or other vehicle structure under, beneath and below the rear deck 26. The basket 18 is structured and operable to hold various accessory items such as golf club covers, a small cooler, hats, jackets, towels, golf balls, gloves and other personal items and equipment. The retention yoke 110 is integrally formed with or otherwise connected to and disposed around a top portion or top edge of the sweater basket 18. In the embodiments wherein the vehicle 10 is configured as a golf car the retention yoke 110, retention straps 114 and retention strap clamps 116 combined are structured and operable to retain golf bags against the retention yoke 110 and within the bag well 30.

Figure 6:
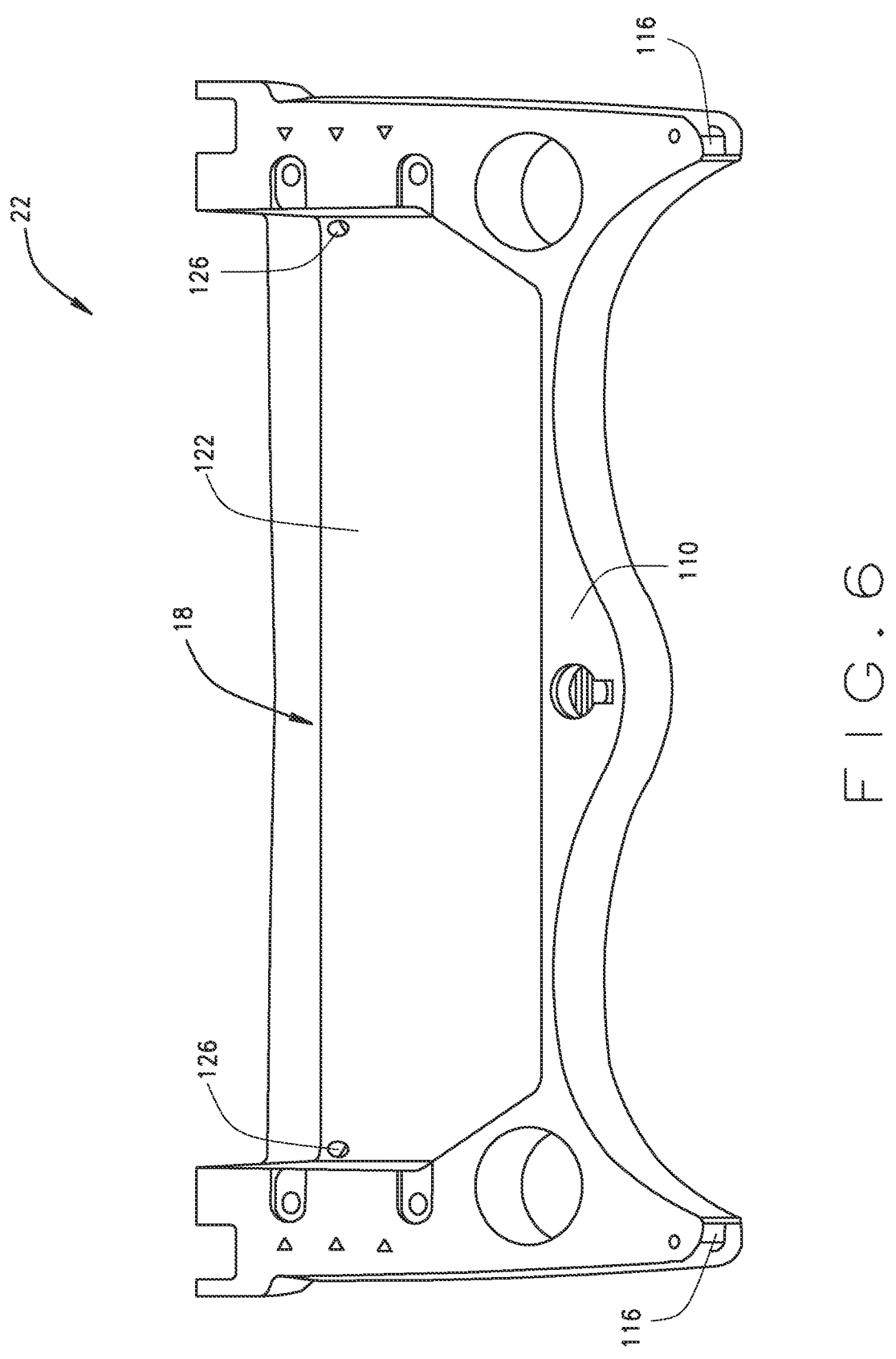
FIG. 6 is a top view of the sweater basket and golf bag retention yoke shown in FIG. 5, in accordance with various embodiments of the present disclosure.
Figure 11:
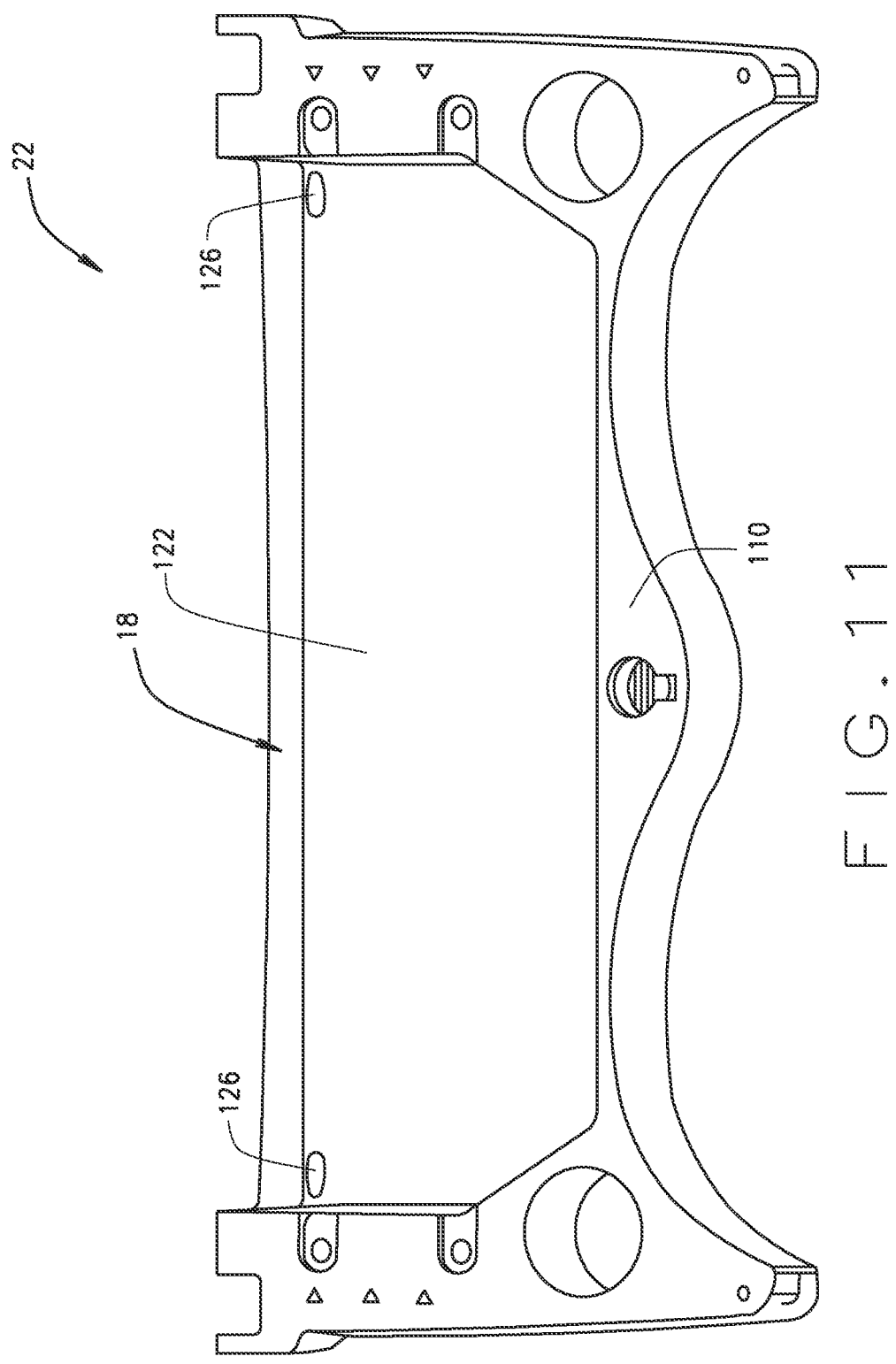
FIG. 11 is a top view of the sweater basket and golf bag retention yoke shown in FIG. 10, in accordance with various embodiments of the present disclosure.

The basket fluid drainage system 14 generally comprises at least one strut boot 118 and the basket 18 (e.g., a sweater basket). Each strut boot 118 is disposed around a respective one of the basket support struts and is mountable within a respective one of the strut apertures 106 formed in the rear deck 26A of the golf car 10. The basket 18 generally comprises a solid bottom 122 having one or more fluid egress port 126 disposed therein (best shown in FIGS. 6 and 11). In various embodiments, the fluid egress port(s) 126 are disposed in one or both of the forward corners of the otherwise solid bottom 122. The basket 18 additionally comprises one or more hollow fluid drain spout 130 extending from an underside of the basket bottom 122, and each drain spout 130 extends from and fluidly is connected to a respective one of the fluid egress ports 126. Each drain spout 130 is structured to direct fluid from within the basket 18 through a respective one of the strut aperture 106 to a ground surface beneath the golf car 10.

As used herein, the word "forward" and the phrase "forward of" are used to describe the direction from a named component or structure toward the front of the vehicle 10. For example, the statement that the fluid egress port(s) 126 is/are disposed in the "forward" corners of the basket solid bottom 122 means the fluid egress port(s) is/are formed corners of the basket bottom 122 nearer the front body assembly 74 than the rear body assembly 78. Similarly, as used herein, the word "rearward" and the phrase "rearward of" are used to describe the direction from a named component or structure toward the rear of the vehicle 10, i.e., nearer the rear body assembly 78 than the front body assembly 74.

Referring now to FIGS. 1, 2, 3, 4, 5 and 6, as described above, the fluid drainage system 14 generally comprises least one strut boot 118 and the basket 18 (e.g., a sweater basket). In various embodiments, the strut boots 118 are structured and formed to comprise an integrally formed spout funnel 134 formed in a sidewall of each strut boot 118. Each spout funnel 138 is funnel shaped (e.g., a conical shaped funnel, or a square shaped funnel, or a triangular shaped funnel, etc.) having a spout receiving orifice 138 formed in a top thereof. Importantly, each spout funnel 134 is integrally formed with strut boot sidewall such that a hollow interior of each spout funnel 134 is open to and fluidly connected with a hollow interior of the respective strut boot 118. Moreover, each strut boot 118 is structured and formed to be generally hollow such that a respective basket support strut 108 can extend therethrough and through the respective strut aperture 106 to be connected to the chassis 34 or other vehicle structure below the rear deck 26. Furthermore, in addition to the hollow interior of each strut boot 118 being open to and fluidly connected with the hollow interior of the respective spout funnel, the hollow interior of each strut boot 118 is open to and fluidly connected with the ambient space beneath the rear deck 26 and the rear body assembly 78. Accordingly, each spout receiving orifice 138 is open to and fluidly connected with the ambient space beneath the rear deck 26 and the rear body assembly 78.

In various embodiments, each drain spout 130 is formed to comprise a hollow truncated neck. In such embodiments, the basket 18 is structured and formed such that each truncated neck drain spout 130 extends from the basket bottom 122 at a direction and angle whereby, when the fluid drainage system 14 is assembled, each truncated neck spout extends into the spout receiving orifice 138 of a respective strut boot spout funnel 134 and into the hollow interior of the respective strut boot spout funnel 134. Accordingly, any fluid (e.g., rain water, melted ice, spilled beverages, etc.) that falls into, forms within and/or is spilled into the basket 18 will flow forward along the basket solid bottom 122 and into the fluid egress ports 126. Thereafter, the fluid will flow through the respective truncated neck drain spout 130, into the hollow interior of the respective strut boot spout funnels 134, and into the interior of the respective strut boot 118. Subsequently, the fluid will be directed by the respective strut boot 118 through the respective strut aperture 106 to the ground surface beneath the rear deck 26.

As used herein the fluid drainage system 14 is considered to be assembled when the respective strut boot 118 is mounted within the respective strut aperture 106, the respective basket support strut 108 extends through the respective strut boot 118 and is mounted to the chassis 34 or other vehicle structure beneath the rear deck 26, and the basket 18, and/or the sweater basket and golf bag retention yoke 22 when the vehicle 10 is configured as a golf car, is mounted to the respective basket support strut 108.

As best shown in FIGS. 2 and 3, in various embodiments, the basket 18 (e.g., the sweater basket 18) can be formed and structured such that the solid bottom 122 is sloped toward the sides of the basket 18 (i.e., the solid bottom 122 slopes downward from the middle toward the sides) and/or is angled forward (i.e., a rearward edge of the solid bottom 122 is disposed higher than a forward edge) such that the force of gravity will cause a fluid that falls into, forms within and/or is spilled into the basket 18 to be directed toward and flow into the fluid egress ports 126.

Referring now to FIGS. 1, 7, 8A, 9, 10 and 11, in various embodiments, the strut boots 118 are structured and formed to comprise a spout aperture 142 formed in the sidewall of each strut boot 118. Particularly, each strut boot spout aperture 142 is formed through the respective strut boot sidewall and is fluidly connected with the hollow interior of the respective strut boot 118. As described above, each strut boot 118 is structured and formed to be generally hollow such that a respective basket support strut 108 can extend therethrough and through the respective strut aperture 106 to be connected to the chassis 34 or other vehicle structure below the rear deck 26. Additionally, the hollow interior of each strut boot 118 is open to and fluidly connected with the ambient space beneath the rear deck 26 and the rear body assembly 78.

In various embodiments, each drain spout 130 is formed and structured to comprise a hollow elongated finger that extends laterally away from and laterally beyond a plane of the basket sidewall nearest which the respective drain spout 130 is formed. Moreover, each elongated finger drain spout 130 is formed and structured to have length L (FIG. 10) such that, when the fluid drainage system 14 is assembled, each elongated finger drain spout 130 will extend through the respective strut boot spout aperture 142. Therefore, the interior space of the basket 18 is fluidly connected to the interior space of the respective strut boot 118. Accordingly, any fluid (e.g., rain water, melted ice, spilled beverages, etc.) that falls into, forms within and/or is spilled into the basket 18 will flow forward along the basket solid bottom 122 and into the fluid egress ports 126. Thereafter, the fluid will flow through the respective elongated finger drain spout 130 and into the hollow interior of the respective strut boot 118. Subsequently, the fluid will be directed by the respective strut boot 118 through the respective strut aperture 106 to the ground surface beneath the rear deck 26.

As described above, in various embodiments, the basket 18 (e.g., the sweater basket 18) can be formed and structured such that the solid bottom 122 is sloped toward the sides of the basket 18 (i.e., the solid bottom 122 slopes downward from the middle toward the sides) and/or is angled forward (i.e., a rearward edge of the solid bottom 122 is disposed higher than a forward edge) such that the force of gravity will cause a fluid that falls into, forms within and/or is spilled into the basket 18 to be directed toward and flow into the fluid egress ports 126.

Referring now to FIGS. 1, 7, 8B, 9, 10 and 11, in various embodiments, in addition to the strut boot(s) 118 and the basket 18 (e.g., the sweater basket 18), the fluid drainage system comprises the basket support strut 108 formed and structured to have a hollow lumen 150 extending therethrough. In such embodiments, the strut boots 118 are structured and formed to comprise the spout aperture 142 formed in the sidewall of each strut boot 118 and furthermore, the basket support struts 108 are structured and formed to comprise a spout orifice 146 formed in a sidewall of each basket support strut 108. The spout apertures 142 and the spout orifices 146 are formed in the respective strut boots 118 and basket support struts 108 such that when the strut boots 118 are mounted within the rear deck strut apertures 106 and the basket support struts 108 are disposed through the strut boots 118 and mounted to the chassis 34 or other vehicle structure below the rear deck 26, the strut boot spout apertures 142 and the basket support strut spout orifices 146 align such that a respective basket drain spout 130 can extend through both the respective spout aperture 142 and spout orifice 146.

Particularly, each strut boot spout aperture 142 is formed through the respective strut boot sidewall and is fluidly connected with the hollow interior of the respective strut boot 118. As described above, each strut boot 118 is structured and formed to be generally hollow such that a respective basket support strut 108 can extend therethrough and through the respective strut aperture 106 to be connected to the chassis 34 or other vehicle structure below the rear deck 26. Additionally, the hollow interior of each strut boot 118 is open to and fluidly connected with the ambient space beneath the rear deck 26 and the rear body assembly 78. Each basket support strut spout orifice 146 is formed through the respective basket support strut sidewall and is fluidly connected with the hollow interior lumen 150 of the respective basket support strut 108 such that hollow interior of the respective strut boot 118 is fluidly connected with the hollow interior lumen 150 of the respective basket support strut 108. Furthermore, each basket support strut hollow lumen 150 is open at the distal end of the respective basket support strut 108 such that each basket support strut spout orifice 146 is fluidly connected through the respective hollow lumen 150 to the ambient space beneath the rear deck 26 and the rear body assembly 78.

In various embodiments, each drain spout 130 is formed and structured to comprise a hollow elongated finger that extends laterally away from and laterally beyond a plane of the basket sidewall nearest which the respective drain spout 130 is formed. Moreover, each elongated finger drain spout 130 is formed and structured to have length L (FIG. 10) such that, when the fluid drainage system 14 is assembled, each elongated finger drain spout 130 will extend through both the respective strut boot spout aperture 142 and basket support strut orifice 146. Therefore, the interior space of the basket 18 is fluidly connected to the interior lumen 150 of the respective basket support strut 108. Accordingly, any fluid (e.g., rain water, melted ice, spilled beverages, etc.) that falls into, forms within and/or is spilled into the basket 18 (e.g., the sweater basket 18) will flow forward along the basket solid bottom 122 and into the fluid egress ports 126. Thereafter, the fluid will flow through the respective elongated finger drain spout 130 and into the hollow interior lumen 15 of the respective hollow lumen 150 of the respective basket support strut 108. Subsequently, the fluid will be directed by the respective basket support strut 108 to the ground surface beneath the rear deck 26. As described above, in various embodiments, the basket 18 (e.g., the sweater basket 18) can be formed and structured such that the solid bottom 122 is sloped toward the sides of the basket 18 (i.e., the solid bottom 122 slopes downward from the middle toward the sides) and/or is angled forward (i.e., a rearward edge of the solid bottom 122 is disposed higher than a forward edge) such that the force of gravity will cause a fluid that falls into, forms within and/or is spilled into the basket 18 to be directed toward and flow into the fluid egress ports 126.

As described above, in various embodiments, the basket 18 (e.g., the sweater basket 18) can be formed and structured such that the solid bottom 122 is sloped toward the sides of the basket 18 (i.e., the solid bottom 122 slopes downward from the middle toward the sides) and/or is angled forward (i.e., a rearward edge of the solid bottom 122 is disposed higher than a forward edge) such that the force of gravity will cause a fluid that falls into, forms within and/or is spilled into the basket 18 to be directed toward and flow into the fluid egress ports 126.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. For example, while certain embodiments may describe a golf car, any similar lightweight vehicle is within the scope of the present invention. Similarly, while certain embodiments may describe a sweater basket, any similar basket is within the scope of the present invention. Such variations and alternative combinations of elements and/or functions are not to be regarded as a departure from the spirit and scope of the teachings.

What is claimed is:

1. A sweater basket drainage system for a golf car, said sweater basket drainage system comprising:

at least one strut boot, each strut boot mountable within a respective one of at least one strut aperture formed in a rear deck of the golf car; and a sweater basket, wherein the sweater basket comprises:

a solid bottom having one or more fluid egress port disposed therein; and one or more hollow drain spout extending from an underside of the bottom of the sweater basket, each drain spout extending from and fluidly connected to a respective one of the one or more fluid egress port, wherein each drain spout is structured to direct fluid from within the sweater basket through a respective one of the one or more strut aperture to a ground surface beneath the golf car.

2. The sweater basket drainage system of claim 1, wherein the at least one strut boot comprises a spout funnel formed in a sidewall thereof.

3. The sweater basket drainage system of claim 2, wherein each drain spout comprises a hollow truncated neck structured to be inserted into the spout funnel of a respective one of the at least one strut boot such that fluid will flow from within the sweater basket into an interior of the respective one of the at least one strut boot and be directed by the respective one of the at least one strut boot through the respective one of the at least one strut aperture to the ground surface.

4. The sweater basket drainage system of claim 1, wherein the at least one strut boot comprises a spout aperture formed in a sidewall thereof.

5. The sweater basket drainage system of claim 4, wherein each drain spout comprises a hollow elongated finger structured to be inserted through the spout aperture of a respective one of the at least one strut boot such that fluid will flow from within the sweater basket into an interior of the respective one of the at least one strut boot and be directed by the respective one of the at least one strut boot through the respective one of the at least one strut aperture to the ground surface.

6. The sweater basket drainage system of claim 4, wherein each drain spout comprises a hollow elongated finger structured to be inserted through the spout aperture of the respective one of the at least one strut boot and through a spout orifice formed in a sidewall of a basket support strut extending through the respective one of the at least one strut boot such that fluid will flow from within the sweater basket into an interior lumen of the basket support strut and be directed by the basket support strut through the respective one of the at least one strut aperture to the ground surface.

7. The sweater basket drainage system of claim 1, wherein the bottom of sweater basket is sloped to direct fluid toward the one or more egress port.

8. A lightweight vehicle, said vehicle comprising:

a rear body having a rear deck; and a sweater basket drainage system, wherein the sweater basket drainage system comprises:

at least one strut boot, each strut boot mountable within a respective one of at least one strut aperture formed in the rear deck; and a sweater basket, wherein the sweater basket comprises:

a solid bottom having one or more fluid egress port disposed therein, wherein the bottom is sloped to direct fluid toward the one or more egress port; and one or more hollow drain spout extending from an underside of the bottom of the sweater basket, each drain spout extending from and fluidly connected to a respective one of the one or more fluid egress port, wherein each drain spout is structured to direct fluid from within the sweater basket through a respective one of the one or more strut aperture to a ground surface beneath the vehicle.

9. The vehicle of claim 8, wherein the at least one strut boot comprises a spout funnel formed in a sidewall thereof.

10. The vehicle of claim 9, wherein each drain spout comprises a hollow truncated neck structured to be inserted into the spout funnel of a respective one of the at least one strut boot such that fluid will flow from within the sweater basket into an interior of the respective one of the at least one strut boot and be directed by the respective one of the at least one strut boot through the respective one of the at least one strut aperture to the ground surface.

11. The vehicle of claim 8, wherein the at least one strut boot comprises a spout aperture formed in a sidewall thereof.

12. The vehicle of claim 11, wherein each drain spout comprises a hollow elongated finger structured to be inserted through the spout aperture of a respective one of the at least one strut boot such that fluid will flow from within the sweater basket into an interior of the respective one of the at least one strut boot and be directed by the respective one of the at least one strut boot through the respective one of the at least one strut aperture to the ground surface.

13. The vehicle of claim 11, wherein the sweater basket drainage system further comprise at least one basket support strut supporting the sweater basket, each basket support strut extending through a respective one of at least one strut aperture, each basket support strut comprising a spout orifice formed in a sidewall thereof.

14. The vehicle of claim 13, wherein each drain spout comprises a hollow elongated finger structured to be inserted through the spout aperture of the respective one of the at least one strut boot and through the spout orifice of a respective one of the at least one basket support strut such that fluid will flow from within the sweater basket into an interior lumen of the respective one of the at least one basket support strut and be directed by the respective one of the at least one basket support strut through the respective one of the at least one strut aperture to the ground surface.

\*   \*   \*   \*   \*